United States Patent [19]

Miller

[11] 3,905,197

[45] Sept. 16, 1975

[54] POWER EXPANDER CENTRIFUGE

[75] Inventor: Arthur J. Miller, Irwin, Pa.

[73] Assignee: Carrier Corporation, Syracuse, N.Y.

[22] Filed: Apr. 29, 1974

[21] Appl. No.: 465,016

[52] U.S. Cl. .................. 60/646; 60/657; 60/649; 60/39.02; 60/39.33; 233/13; 233/23; 233/43

[51] Int. Cl. .................. F02c 1/00; F01k 25/00

[58] Field of Search ............ 60/646, 643, 645, 650, 60/657, 671, 651, 721, 682, 649, 39.19, 39.33, 39.02; 233/23 R, 11, 12, 13, 43; 55/389

[56] References Cited
UNITED STATES PATENTS

| | | | |
|---|---|---|---|
| 1,666,523 | 4/1928 | Bailey | 60/649 X |
| 2,689,456 | 9/1954 | White | 60/39.33 X |
| 3,473,331 | 10/1969 | Fernandes | 60/39.33 |
| 3,550,372 | 12/1970 | Craig | 60/39.33 X |

Primary Examiner—Martin P. Schwadron
Assistant Examiner—Allen M. Ostrager
Attorney, Agent, or Firm—J. Raymond Curtin; Thomas J. Wall

[57] ABSTRACT

A power producing expander for processing waste gas emitted from processing equipment at relatively high temperatures, the gases further containing a high concentration of solid waste contaminants. The expander renders the gases suitable for use as a working fluid within a power recovery device such as a turbine or the like and augments the power input to the shaft of the device. A centrifugal rotor, operatively associated with the power shaft, is arranged to centrifuge the waste gases moving through the expander to isolate the solid waste contaminants in a defined subflow whereby the waste products can be efficiently separated from the main gas stream. A relatively cool fluid is introduced into the gas stream within the expander to reduce the temperature of the gases to an acceptable working level prior to introducing the gases into the power recovery machine. The coolant further provides a seal adjacent to the shaft to prevent the gases from escaping to regions of lower pressure.

24 Claims, 7 Drawing Figures

POWER EXPANDER CENTRIFUGE

BACKGROUND OF THE INVENTION

This invention relates to power recovery apparatus and, in particular to a power expander for processing relatively high temperature, normally wasted, gases containing high concentrations of solid materials thus rendering the gases suitable for use as a working fluid within a turbine or other such power recovery equipment.

Due to the increasing energy shortage, methods of recovering heretofore wasted energy are being looked towards as a potential source of power. A typical process which produces a great deal of energy that is normally wasted is found in the coal gasification industry. In coal gasification, high temperature exhausted gases are generated as a by-product of the process. Because of the nature of the process, these hot gases contain a very high percentage of solid waste materials in the form of fly ash, dolomite and the like. The use of this potentially high energy source in power recovery equipment has heretofore proven unfeasible because the recovery equipment generally is subjected to catastrophic failure resulting from blade erosion under the action of the solid waste particles and/or material fatigue caused by the high operating temperatures. Furthermore, to compound the difficulties, it has been found that the erosion rate increases drastically with increases in gas temperatures.

SUMMARY OF THE INVENTION

It is therefore an object of the present invention to conserve normally wasted energy.

It is a further object of the present invention to provide apparatus for rendering heretofore unusable waste gases suitable for use as a working fluid within power recovery equipment.

Another object of the present invention is to provide apparatus for processing normally wasted gases into a usable working fluid for downstream processing equipment, the processing apparatus being capable of delivering shaft power to said downstream equipment.

Yet another object of the present invention is to protect expensive power recovery equipment from the effects of the extremely high temperature, solid waste containing, working fluids by preprocessing the working fluids through a power expander having inexpensive, readily replaceable working components.

These and other objects of the present invention are attained by means of an independent gas expander located upstream from a power recovery device, such as a turbine or the like; the expander having a centrifugal rotor for receiving high temperature, dirty, normally wasted gas products from a processing plant, the rotor having converging blade passages for accepting an axial inflow of such gases and turning the flow in a substantially radial direction whereby the gases are centrifuged within the blade passages to create a defined subflow, within the main gas stream, that contains a preponderance of the solid waste contaminants, a capture chamber at the output to the rotor for entrapping the solid waste particles contained within the subflow and means for passing the relatively clean gases to the downstream power recovery equipment.

In a further embodiment of the present invention, a relatively cool fluid is introduced into the expander which serves to cool the relatively high temperature process gases and provide a high pressure seal about the rotor shaft.

BRIEF DESCRIPTION OF THE DRAWINGS

For a better understanding of the present invention as well as other objects and further features thereof, reference is had to the following detailed description of the invention to be read in connection with the accompanying drawings, wherein.

DESCRIPTION OF THE PREFERRED EMBODIMENT

Figure 1:
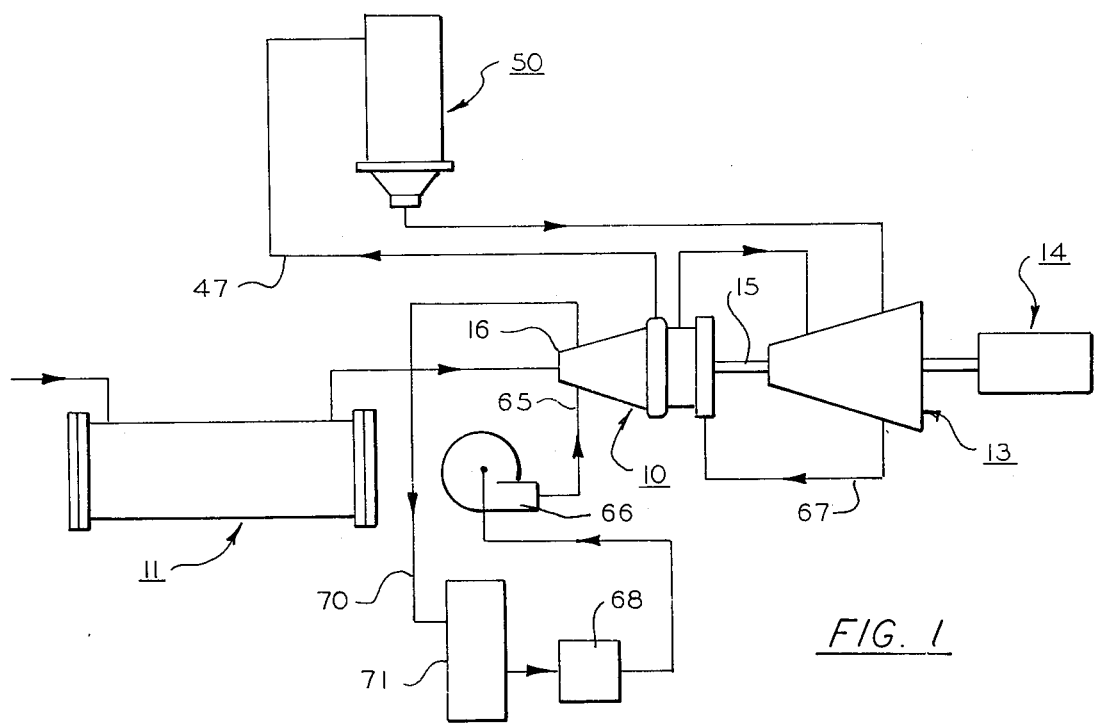
FIG. 1 is a schematic flow diagram showing a power recovery system utilizing the apparatus of the present invention.

Referring now to the drawings, and in particular to FIG. 1, there is illustrated a schematic view of a waste energy recovery system utilizing a power producing expander 10 embodying the teachings of the present invention. The expander is arranged to receive normally wasted exhaust gases from a downstream processing plant 11, as for example, a coal gasification plant. For the purposes of the present disclosure, the term "waste gas" generally refers to a fluid that is at a relatively high temperature and/or pressure containing a high concentration of solid waste particles which would normally render the gas unsuitable for use in a conventional power recovery device. As will be explained in greater detail below, these normally wasted gases are passed through the expander of the present invention where the gases are cooled and cleaned prior to their delivery to a downstream power recovery device, as for example, turbine 13, where the gases are utilized as a working fluid to generate power. It should be noted that the expander and the turbine are both coupled to a common shaft 15 which, in turn, is used to drive a power absorbing device 14 typically being a compressor or an electrical generator.

Figure 2:
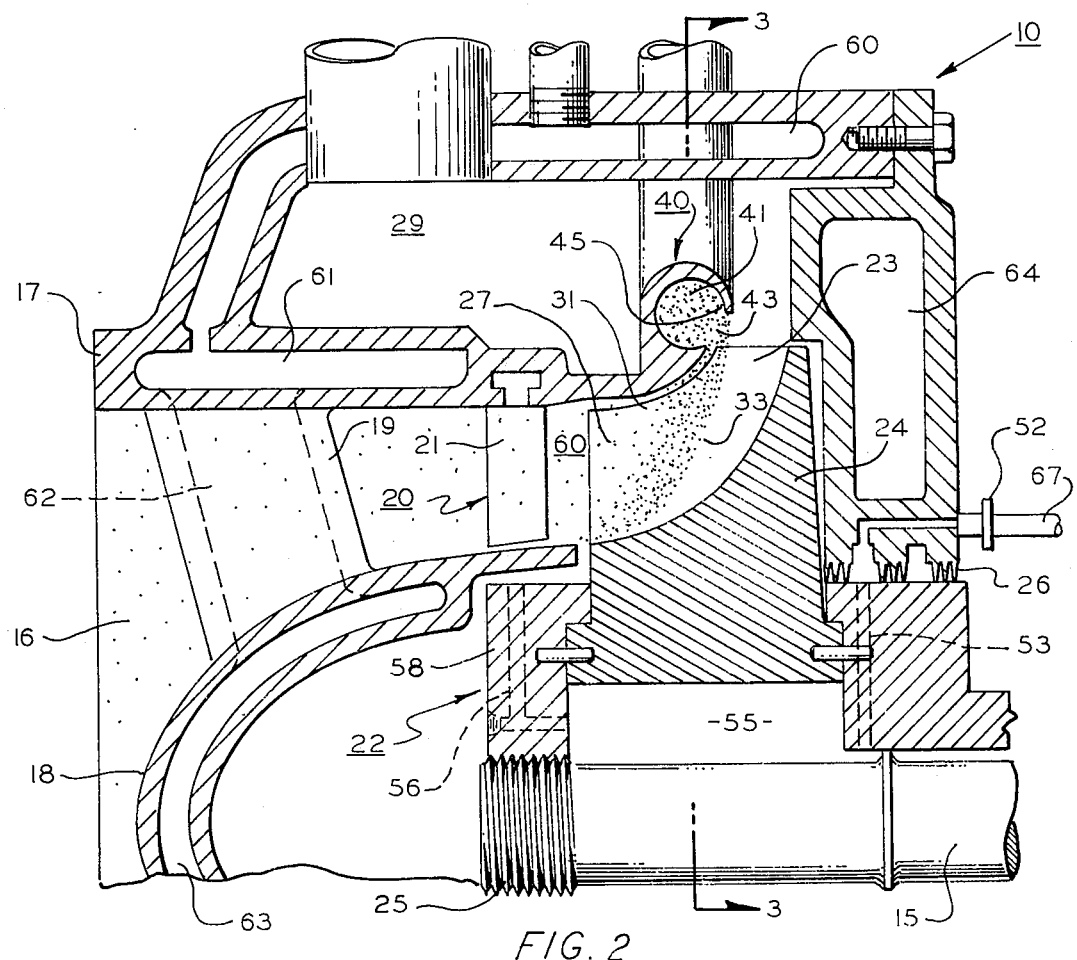
FIG. 2 is an enlarged partial section showing a power expander embodying the teachings of the present invention and further illustrating means for capturing solid waste contaminants passing through the expander as well as means for introducing high pressure coolant into the process gases.

In practice, the waste gases are delivered directly from the exhaust of the treatment plant to the axial intake passage 16 of the expander. As best illustrated in FIG. 2, the intake passage includes an annular shaped outer casing 17 having a centrally located axially aligned conical flow guide 18 supported therein upon a plurality of support bars 19. Downstream from the flow guide is positioned a nozzle stage 20 made up of an annular ring of stator blades 21 that are affixed in a conventional manner within the interior walls of casing 17. The nozzles provide a full vortex 360° axial flow to a single rotor section, generally referenced 22. The rotor, in practice, is an impeller having a series of vanes 23 affixed, as for example by welding, to a disk 24. The disk, in turn, is affixed to shaft 15 by means of screw threads 25, or any other means presently known and used in the art. Conventional closures and seals, such as labyrinth seal 26, are also provided within the expander to prevent gas leakage and to control the flow of fluids moving therethrough.

The impeller vanes are arranged to accept the axially rotating gas flow from the nozzles and turn the gas stream in a substantially radial direction whereby the gases are discharged into an exhaust chamber 29. The vanes of the impeller are shaped to form converging passages which provide for a positive reaction outflow of the waste fluids thus delivering driving power to the shaft 15. It should also be noted that the converging nozzle passages further serve to reduce the gas temperatures and pressures, the advantages of which will become apparent from the discussion below.

By turning the axial input to the impeller into a substantially radial outflow, the impeller, in effect, acts as a centrifuge in relation to the processed fluids. The length of the blade passages, and the speed of the impeller, are regulated so that the heavier substances in the gas stream, and in particular the solid waste particles, are forced toward the short radius side 31 of each impeller passage. The velocity of the gas leaving the tip of the impeller is maintained at, or preferably below, sonic velocity (Mach 1), to establish laminar flow condition within the impeller. The centrifugal forces, generated within the laminar stream, force the heavier substances passing through the rotor passage into a secondary or subflow stream 27. Because of the drag forces involved, this subflow moves through the rotor passages at a relatively lower velocity than the uncontaminated gases thus creating a definable gradient 33 therebetween.

Figure 7:
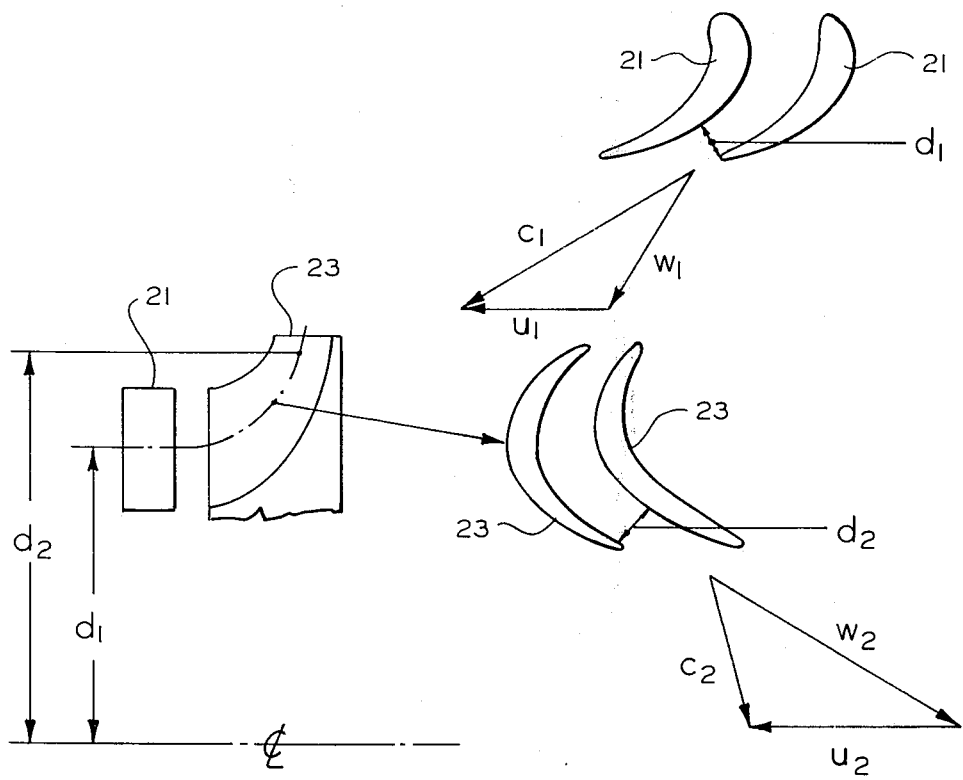
FIG. 7 shows a typical clean gas velocity diagram for a radial outflow expander of the type illustrated in FIG. 2.

Referring now to FIG. 7, there is shown a typical velocity diagram for the radial outflow expander illustrated in FIG. 2. To obtain acceptable erosion life, it has been found that the absolute velocity of the gas flow leaving the nozzle blades, as well as the relative velocity of the clean gas stream leaving the rotor tips, should both be equal to or less than 0.85 Mach at the respective throat conditions when the expander is operating at or near a peak velocity ratio. It should be understood that the term "peak velocity ratio" relates to the isentropic velocity ratio at which peak efficiency occurs.

By controlling the pitch line diameter of the nozzle and rotor stages, the respective pitch line velocities of these stages can be controlled within the desired range. It is found that when the pitch line diameter of the nozzle is held to between 0.5 and 0.9 times that of the rotor, the absolute outflow velocity of the nozzle and the relative velocity of the clean gases leaving the tip of the impeller occur at or below the 0.85 Mach number. That is:

$$.9 > \frac{d_1}{d_2} = \frac{u_1}{u_2} > .5$$

where:
$d_1$ and $d_2$ are the pitch line diameter of the nozzle and rotor stages, respectively, taken at the throat as illustrated in FIG. 7, and
$u_1$ and $u_2$ are the pitch line velocity components of the clean gas leaving the nozzle and rotor, respectively, as illustrated in FIG. 7.

It should be noted that the velocity diagram herein depicted relates to the velocity of the clean gases moving therethrough and, it should be understood, that it follows that the dirty or contaminated subflow will be moving at a slightly lower velocity because of the drag factors involved.

Referring once again to FIG. 2, an annular cylinder-like collector 40 is secured as by welding or casting to the main casing of the cylinder. The interior of the collector provides a hollow capture chamber 41 into which the definable subflow leaving the tip of the impeller freely flows. An annular opening 43 is provided in the lower wall of the collector adjacent to the tip of the impeller blades through which the gases flow into the capture chamber. The right-hand wall, as viewed in FIG. 2, of the capture chamber which defines one side of the opening 43, terminates in a lip 45 extending outwardly from the short radius side of the impeller blades a sufficient distance to substantially encompass the defined subflow gradient whereby the entire subflow leaving the blades moves into the chamber 41.

Figure 3:
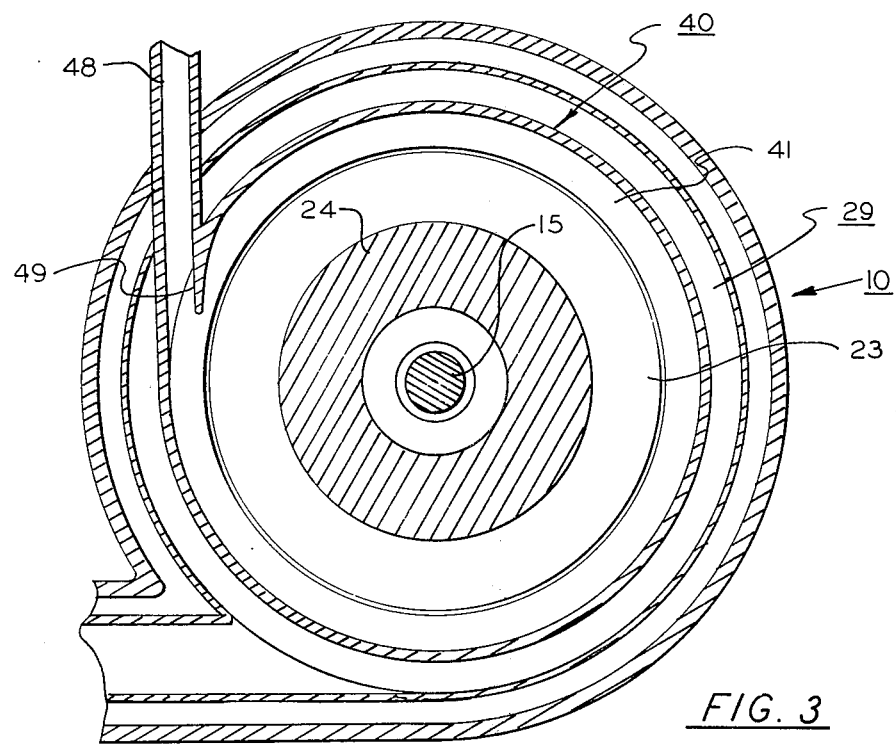
FIG. 3 is a typical section taken along line 3—3 in FIG. 2 illustrating the construction of the solid waste capture chamber.

As more clearly shown in FIG. 3, the annular capture chamber is placed in fluid flow communication with a tangentially aligned exhaust conduit or tube 48 which extends upwardly beyond the outer periphery of the expander casing. The exhaust tube is connected, as illustrated in FIG. 1, to a cyclone separator 50 via line 47. The dirty gases, acting under the influence of the impeller, leave the impeller tips with a considerable whirl velocity which readily creates a vortex within the capture chamber tending to force the gases into the exhaust tube 48. A vortex suppressor vane 49 is shown to prevent excessive erosion of the capture chamber. A slightly lower pressure is maintained between the dirty gases within the capture chamber and the clean gases exhausted into chamber 29 whereby the contaminated gases are readily drawn through the discharge tube 48 and delivered into the downstream separator. The solid waste contaminants are removed from the dirty gases within the cyclone separator and the remaining gases introduced into the turbine at a suitable point downstream from the turbine inlet, the point of introduction being dependent upon the state of the gas leaving the separator.

The expander herein disclosed has further means for substantially reducing the temperature of the process gases in order to extend the usable life of the expander wear components and to bring the gas temperatures down to a level more suitable for use in the more conventional power recovery equipment. In reference to FIGS. 1 and 2, the cooling fluid is drawn from the working fluid passing through turbine 13 at some stage downstream from the inlet via line 67. The point at which the fluid is bled from the turbine is dependent upon the condition of the waste gas products and the amount of cooling required. Although not shown, it is preferred that the pressure of the cooling fluid be raised to a level slightly higher than the operating pressures maintained in the gas expander, as for example, by a pump means or the like.

The cooling fluid enters the expander at adapter 52 (FIG. 2) and is passed through labyrinth seal 26. The coolant, being at a higher pressure than the waste gases, thus provides a barrier at the seal to shaft interface which serves to prevent the process gases from escaping about the shaft to the surrounding regions of lower pressure.

Upon passing through the seal, the coolant is delivered by means of feed ports 53 into an annular plenum 55 where it is temporarily stored, to provide a sink for cooling of the rotor hub structure. A series of discharge holes 56 are arranged within the rotor end plates 58 which extend upwardly in a radial direction to meter the coolant into gas entrance region 60 ahead of the rotor vanes. Here the coolant is mixed with the relatively hot waste gases in sufficient quantity to reduce the gas temperature to a desired operating level, the operating temperature being dependent upon the heat balance suitable for the particular application involved.

Although the cooling fluid in this particular application is bled directly from the downstream power recovery equipment, it should be understood that the coolant can be drawn from any suitable independent source provided the entering state of the cooling fluid and the volume rate of flow maintained through the expander are regulated to reduce the temperature of the gas confining metal parts to a predetermined level and maintain the desired cooling of the waste gases moving through the expander by an amount depending upon the heat exchange rate application.

A secondary cooling system is also herein provided for further reducing the effects of the high temperature waste gases upon the expander structure. As seen in FIG. 2, the enclosing structure of the expander is provided with a hollow cooling jacket having interrelated passages 60–64 through which a cooling fluid, such as water or the like, is pumped. The passages making up the jacket are connected in fluid flow communication at common input 65 through which the coolant is delivered by means of a pump 66 (FIG. 1) from reservoir 68. Under the influence of the pump, the fluid is circulated through the jacket to reduce the temperature of the expander structure to an acceptable operating level. The coolant is then exhausted from the jacket at a second common point 69 and then passed through line 70 to heat exchanger 71 before being returned to the supply reservoir.

Figure 4:
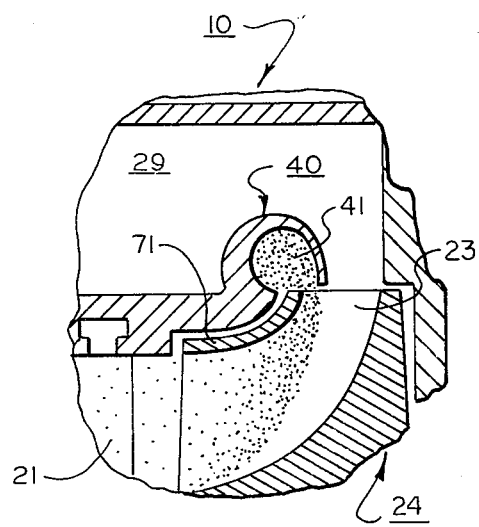
FIG. 4 is an enlarged partial section view showing the rotor of the expander having a movable shroud thereon for directing solid waste contaminants into the capture chamber.

A second embodiment of the present invention is illustrated in FIG. 4. In this particular embodiment, a movable shroud 71 has been added to the rotor impeller to provide increased reliability to the system and to enhance the erosion resistance characteristics to the rotor vanes. The shroud also provides a rotating boundary to further reduce the velocity of the dirt containing subflow relative to the confining boundary. This, in turn, also reduces shroud boundary erosion and vane erosion in critical areas as well as insuring that laminar flow conditions are maintained within the system. It should be further understood that a relatively hard coating may also be added to the shroud surfaces coming in contact with the solid waste component thereby greatly reducing the erosion rate and extending the life of the rotor.

Figure 5:
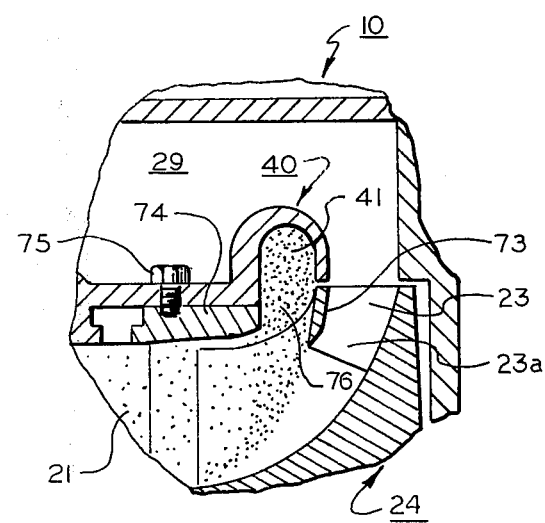
FIG. 5 is another embodiment of the present invention illustrating the use of a split discharge vane positioned within the rotor passage for directing solid waste contaminants into the capture chamber.

In a third embodiment of the present invention illustrated in FIG. 5, a rotating splitter shroud 73 is affixed to the impeller blades. The splitter shroud is positioned within the rotor passages and is arranged to further segregate the contaminated gases into a defined subflow within the rotor and direct the subflow into the capture chamber 41. A stationary partial shroud 74 is also provided that is attached to the expander casing by cap screws 75 for easy replacement. The stationary partial shroud is arranged to establish a relatively large opening 76 into the capture chamber. The combined effect of the splitter shroud 73 and the stationary partial shroud 74 permits the expander to handle a relatively low velocity subflow. The addition of splitter shroud 73 also makes it possible to support partial blades 23a between the main impeller blades 23 to allow a smaller efflux angle on the impeller to increase the overall performance of the stage.

Figure 6:
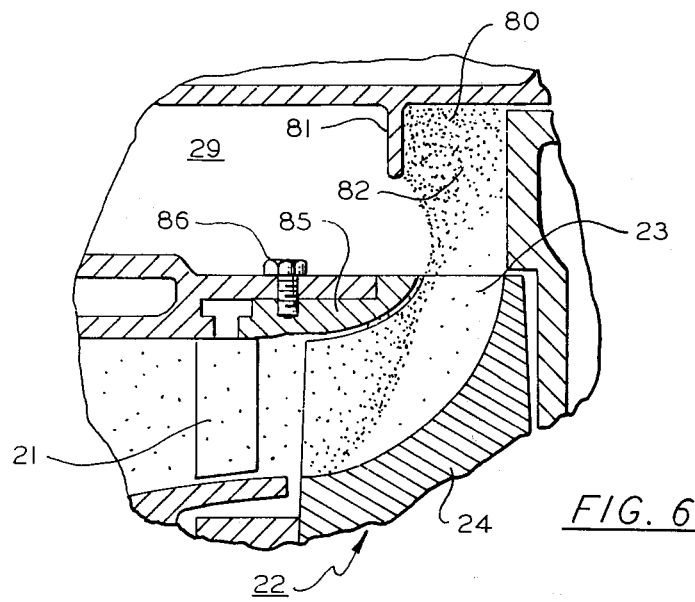
FIG. 6 further illustrates an alternate embodiment of the present invention for collecting waste contaminants within a scroll-like chamber mounted in the exhaust region of the expander, the rotor being provided with a stationary shroud for containing the gases moving therethrough.

FIG. 6 illustrates a still further embodiment of the present invention. As shown, a scroll-type collecting chamber 80 is conveniently located within the expander exhaust chamber 29. Chamber 80 is defined by a downwardly extending radial wall 81 affixed to the top wall 82 of the exhaust chamber 29 having a circumferential inlet annulus area generally 82. In this arrangement, the subflow is generated at the discharge throat of the rotor passage, rather than in the impeller passages as shown, the throat is defined by the adjacent blades 23 and a replaceable stationary shroud 85 attached to the expander casing via bolts 86. The whirl velocity imparted to the leaving gases acts to throw the contaminated subflow gases into the capture chamber 80 while the lighter, relatively clean gases, pass freely beyond the radial wall 81 into the exhaust chamber 29. Here again, means for exhausting the contaminated gases, similar to that shown in FIG. 3, are provided to deliver the gases into cyclone separator 50. Extremely small density, relatively light particles can be efficiently separated in this manner when a subflow gradient cannot be efficiently established within the rotor as described above.

While this invention has been described with reference to the structure herein disclosed, it is not necessarily confined to the details as set forth, and this application is intended to cover any modifications or changes that may come within the scope of the following claims.

What is claimed is:

1. Apparatus for treating relatively dirty, normally wasted, high energy gases emitted from processing equipment in order to render the gases usable as a working fluid in power recovery machinery including
   centrifuge means for receiving and acting upon a dirty gas stream emitted from the processing equipment to establish a defined subflow within the main stream containing heavy dirt producing contaminants,
   capture means positioned adjacent to the exit of said centrifuge means for entrapping the subflow and isolating the subflow from the main uncontaminated gas stream, and
   means for delivering the uncontaminated gas stream to downstream power recovery machinery for use as a working fluid therein.

2. The apparatus of claim 1 wherein said centrifuge is a centrifugal impeller being arranged to accept an axial inflow of dirty waste gases from the processing equipment and turning the flow in a substantially radial direction.

3. The apparatus of claim 2 wherein said impeller has a plurality of vanes being arranged to form converging flow passages, said impeller being affixed to a common shaft with the downstream power recovery machinery whereby said impeller delivers work to said shaft.

4. The apparatus of claim 3 wherein the dirty gases are initially passed through a nozzle stage prior to entering said impeller.

5. The apparatus of claim 4 wherein the throat velocity of the gases passing through the nozzle and the throat velocity of the gases passing through the impeller are both at or below 0.85 Mach.

6. The apparatus of claim 5 wherein the pitch line diameter at the throat of said nozzle is between 0.5 and 0.9 times the pitch line diameter at the throat of said impeller.

7. The apparatus of claim 1 having a further means to introduce a cooling fluid into the gas flow passing through the apparatus whereby the temperature of said gases is maintained at a level that is within the operating range of the power recovery machinery.

8. The apparatus of claim 7 wherein said cooling fluid is introduced into the gas stream between the rotor and the impeller to insure complete mixing of said cooling fluid into said gas stream.

9. The apparatus of claim 8 wherein the cooling fluid is passed through the impeller hub structure prior to being introduced into the gas stream, the impeller structure is cooled by said fluid.

10. The apparatus of claim 9 wherein said cooling fluid is maintained at a higher pressure than said gases passing through said apparatus, said apparatus having shaft seal means and means for passing the cooling fluid through said seal means whereby the fluid acts against the gases within said apparatus to prevent the gases from escaping to regions of lower pressure.

11. An expander for treating high temperature dirt containing gases emitted from a processing plant to render the gases suitable for use as a working fluid in power recovery equipment including
a rotary impeller being affixed to the power output shaft of the recovery equipment, said impeller having a plurality of converging guide vanes for accepting an axial inflow of said gases from the processing plant and turning the gases in a substantially radial direction,
a nozzle stage positioned downstream at the flow entrance to said impeller, the pitch line diameter at the throat of said nozzle and the pitch line diameter at the throat of said impeller being at a ratio so as to establish a laminar flow of said gases within said impeller whereby the heavier dirt producing contaminants within the main gas stream are forced into a defined subflow at the exit to said impeller,
capture means having a chamber for entrapping the subflow leaving the impeller and isolating the subflow from the uncontaminated main gas stream,
means for introducing a cooling fluid into said gases moving through the expander to reduce the gas temperatures to a level that is within the operating range of said power recovery equipment, and
means to deliver the uncontaminated relatively cool, gases to the inlet of said power recovery equipment.

12. The expander of claim 11 wherein said impeller is provided with a movable shroud arranged to reduce the velocity of the subflow established within said impeller.

13. The expander of claim 12 wherein the gas contacting surfaces of the shroud are coated with a relatively hard material to reduce the erosion effect of the dirty gases upon said shroud.

14. The expander of claim 11 wherein said impeller includes splitter vanes extending into the gas stream and being positioned to divert the defined subflow into said capture chamber.

15. The expander of claim 14 further including a stationary shroud affixed to said expander structure and being positioned at the exit to the impeller adjacent to the capture chamber to provide a relatively large opening through which the split subflow enters said capture chamber.

16. The expander of claim 11 further including secondary cooling means comprising a fluid-tight jacket enclosed within the stationary walls of said expander and pump means for passing a coolant through said jacket to maintain the expander structure at a relatively low temperature in relation to the gases passing therethrough.

17. The apparatus of claim 11 wherein the subflow is generated at the throat of said impeller, the subflow being directed through the exhaust region of said expander into a capture chamber mounted in the outer wall thereof.

18. The apparatus of claim 11 wherein said capture means includes an annular substantially enclosed chamber mounted adjacent to the exit of said impeller and having an opening therein which overlies the defined boundary of said subflow wherein said subflow leaving the impeller flows into said capture chamber and the uncontaminated gases pass freely past said capture means.

19. The apparatus of claim 18 having further means operatively associated with said capture chamber for exhausting the subflow entrapped therein from said expander.

20. The apparatus of claim 19 having further means associated with said capture chamber for suppressing the vortex flow created therein.

21. The method of rendering dirty, high temperature, normally wasted gases suitable for use as a working fluid in power equipment including
centrifuging said gases to create a defined laminar subflow within a main gas stream, said subflow containing the heavier dirt producing contaminants,
diverting the subflow into a capture chamber to isolate the dirt containing gases from the uncontaminated gases,
delivering the uncontaminated gases to the inlet of the power recovery equipment.

22. The method of claim 21 further including the step of introducing a cooling fluid into the gases prior to the gases being delivered to said power recovery equipment to reduce the temperature of the gases within the operating range of said equipment.

23. The method of claim 22 including the further steps of passing the isolated subflow through a separator for removing the contaminants from the subflow, and injecting the remaining subflow gases into said power recovery equipment.

24. The method of claim 21 further including the steps of expanding the gases as they are being centrifuged, and recovering the energy of expansion in the form of shaft power delivered to said power recovery equipment.

* * * * *